(12) United States Patent
Zhou et al.

(10) Patent No.: US 9,878,422 B2
(45) Date of Patent: Jan. 30, 2018

(54) MULTI-ANGLE AUTOMATED POLISHING SYSTEM AND POLISHING METHOD

(71) Applicant: Guangdong Institute of Intelligent Manufacturing, Guangzhou (CN)

(72) Inventors: Xuefeng Zhou, Guangzhou (CN); Kaige Li, Guangzhou (CN); Dan Huang, Guangzhou (CN); Xiaoming Jiang, Guangzhou (CN); Xiaoguang Liu, Guangzhou (CN); Taobo Cheng, Guangzhou (CN)

(73) Assignee: Guangdong Institute of Intelligent Manufacturing (CN)

( * ) Notice: Subject to any disclaimer, the term of this patent is extended or adjusted under 35 U.S.C. 154(b) by 75 days.

(21) Appl. No.: 14/888,024

(22) PCT Filed: Oct. 24, 2014

(86) PCT No.: PCT/CN2014/089455
§ 371 (c)(1),
(2) Date: Oct. 29, 2015

(87) PCT Pub. No.: WO2016/049957
PCT Pub. Date: Apr. 7, 2016

(65) Prior Publication Data
US 2016/0250736 A1 Sep. 1, 2016

(30) Foreign Application Priority Data

Sep. 30, 2014 (CN) .......................... 2014 1 0523072

(51) Int. Cl.
*B24B 41/00* (2006.01)
*B24B 41/06* (2012.01)
(Continued)

(52) U.S. Cl.
CPC ................ *B24B 41/06* (2013.01); *B23C 3/00* (2013.01); *B24B 5/16* (2013.01); *B24B 5/355* (2013.01);
(Continued)

(58) Field of Classification Search
CPC ........... B24B 5/16; B24B 5/355; B24B 41/06; B24B 41/061; B24B 49/00; B24B 51/00
See application file for complete search history.

(56) References Cited

U.S. PATENT DOCUMENTS 1,576,448 A * 3/1926 Mudra ...................... B24B 5/16
144/24.08
3,552,066 A * 1/1971 Gladstone .............. B23Q 15/00
451/1
(Continued)

FOREIGN PATENT DOCUMENTS

CN 201205677 Y 3/2009
CN 102848296 A 1/2013
(Continued)

OTHER PUBLICATIONS

International Search Report for Application No. PCT/CN2014/089455 dated Jul. 10, 2015.

*Primary Examiner* — Timothy V Eley
(74) *Attorney, Agent, or Firm* — Lerner, David, Littenberg, Krumholz & Mentlik, LLP

(57) ABSTRACT

A multi-angle automated polishing system comprises a workbench, a holding unit, a polishing unit, and a control unit. The holding unit comprises a holding component for holding an object, a transverse drive configured to drive the holding component to move transversely along the plane of the workbench, a translational drive configured to drive the holding component to move translationally along the plane of the workbench, and a rotary drive configured to drive the holding component to rotate transversely along the plane of
(Continued)

the workbench. The holding unit further comprises a rotating unit and a rotating drive configured to drive the rotating unit to rotate. The polishing unit comprises a polishing component and a polishing drive configured to drive the polishing unit in operation. The control unit is connected to the transverse drive, the rotary drive, the rotating drive, and the polishing drive.

9 Claims, 18 Drawing Sheets

(51) Int. Cl.
    *B24B 49/00*     (2012.01)
    *B24B 51/00*     (2006.01)
    *B24B 29/00*     (2006.01)
    *B24B 37/005*    (2012.01)
    *B23C 3/00*     (2006.01)
    *B24B 5/16*     (2006.01)
    *B24B 5/35*     (2006.01)

(52) U.S. Cl.
    CPC ............ *B24B 29/00* (2013.01); *B24B 37/005* (2013.01); *B24B 41/061* (2013.01); *B24B 49/00* (2013.01); *B24B 51/00* (2013.01)

(56) References Cited

U.S. PATENT DOCUMENTS

| | | | |
|---|---|---|---|
| 4,907,371 A | | 3/1990 | Shoda et al. |
| 6,234,885 B1 * | | 5/2001 | Haferkorn ................. B24B 5/16 |
| | | | 451/121 |
| 6,685,536 B1 * | | 2/2004 | Junker ...................... B24B 5/16 |
| | | | 451/221 |
| 8,690,450 B2 * | | 4/2014 | Itou .......................... B24B 5/16 |
| | | | 29/898.066 |

FOREIGN PATENT DOCUMENTS

| | | |
|---|---|---|
| CN | 202846323 U | 4/2013 |
| CN | 203343857 U | 12/2013 |
| CN | 203357201 U | 12/2013 |
| CN | 203371374 U | 1/2014 |
| CN | 203779307 U | 8/2014 |
| CN | 204183373 U | 3/2015 |
| EP | 0395576 A1 | 10/1990 |

\* cited by examiner

MULTI-ANGLE AUTOMATED POLISHING SYSTEM AND POLISHING METHOD

CROSS-REFERENCE TO RELATED APPLICATIONS

The present application is a national phase entry under 35 U.S.C. § 371 of International Application No. PCT/CN2014/089455 filed Oct. 24, 20154, which claims priority from Chinese Application No. 201410523072.4 filed Sep. 30, 2014, all of which are hereby incorporated herein by reference.

TECHNICAL FIELD

The present application relates to the field of polishing, especially to a multi-angle automated polishing system and polishing method.

BACKGROUND

Among the many ways for polishing metal surface, the prior mechanical polishing methods involves expensive equipments and complicated operations that hinder their wide application in the polishing industries of small profits. Complicated surface polishing is mainly conducted manually, with mechanical polishing wheel and belt polishing methods, which involves very simple equipments and easy operations. However, polishing quality as such depends on the proficiency and eyeball control of the worker and thus of low stability. Meanwhile, the working environment is detrimental to the health of most polishing workers as well as to the environment because of the dusts and vibration generated during the polishing process. Some small workshops or shops still use manual, mechanical polishing wheels for workpiece polishing, while other large-scale polishing factories have been generalizing batch polishing methods. Batch polishing method mixes a batch of parts with abradant and catalysts in certain proportions and feeds the mixture to roller containers to undergo frictional collision for polishing. Advantages of such a method include low labour intensity, high efficiency, low requirement of worker proficiency, stable quality, and applicability to various shapes of parts. However, the surface smoothness of products from this method is relatively low. As to the polishing of solid of revolution, the workpiece has relatively weak rigidity when the revolved body is a shell (e.g., a vacuum cup), which is not suitable for batch polishing method and mainly relies on manual polishing.

SUMMARY

It is necessary to provide a multi-angle automated polishing system that can perform multi-angle automated polishing with precision, protection for workers' health, and low costs.

A multi-angle automated polishing system is disclosed herein, comprising a workbench and a holding unit, provided with a holding component for holding an object, a transverse drive configured to drive the holding component to move transversely along the plane of the workbench, a translational drive configured to drive the holding component to move translationally along the plane of the workbench, and a rotary drive configured to drive the holding component to rotate transversely along the plane of the workbench, wherein the holding unit further comprises a rotating unit and a rotating drive configured to drive the rotating unit to rotate;

a polishing unit, provided with a polishing component and a polishing drive configured to drive the polishing component in operation; and a control unit, connected to the transverse drive, the rotary drive, the rotating drive, and the polishing drive.

The multi-angle automated polishing system disclosed herein may hold the object to be polished tightly with the holding unit. It may move in three perpendicular directions of the object to be polished with the combined operation of the transverse drive, translational drive, and rotary drive of the polishing unit, so as to accomplish multi-angle and multi-directional rotation and accurate and precise polishing of the objects to be polished. The series of holding and polishing steps of the objects to be polished are automated, requiring no manual intervention, which reduces direct contact of the workers with the polishing unit and the objects to be polished and thus greatly protects their health. The polishing equipments require low investments and further save labour and time costs.

In one of the embodiments, the holding component comprises a baseplate, a first gripping portion, and a second gripping portion.

The first and second gripping portions are both hinged to the baseplate. The holding unit further comprises a second gripping portion drive configured to drive the second gripping portion to rotate along the plane of the baseplate. The cooperation among the baseplate, the first gripping portion and the second gripping portion allow more precise holding operation by the holding component. The gripping drive unit drives the second gripping portion to rotate along the plane of the baseplate, allowing more convenient and even automated gripping (holding) and releasing of the objects with high efficiency.

In one of the embodiments, when the second gripping portion rotates to where an end portion of the second gripping portion is oriented to the first gripping portion, the distance between the end portions of the first and second gripping portions matches the dimensions of the object, while the axis defined by a line connecting the end portions of the first and second gripping portions is parallel with the plane of the workbench and perpendicular to the direction in which the holding component moves transversely along the plane of the workbench. The space between the end portions of the first and second gripping portions matches the dimensions of the objects, which help preventing objects from falling during polishing.

In one of the embodiments, the second gripping portion rotates around the axis defined by a line connecting the end portions of the first gripping portion and the second gripping portion, in order to facilitate releasing of the objects.

In one of the embodiments, the second gripping portion drive comprises a telescopic shaft and a first telescopic cylinder configured to drive the telescopic shaft in a telescopic motion, the first telescopic cylinder being hinged on the baseplate.

One end portion of the telescopic shaft is connected to an end portion of the second gripping portion and the other end portion of the telescopic shaft connected to the first telescopic cylinder. As a result, the holding operation of the holding component becomes more precise. The cooperation between the telescopic components and the first telescopic cylinder allows more convenient, and even automated, holding and releasing operations of the objects with high efficiency.

In one of the embodiments, the multi-angle automated polishing system further comprises a guide rail, the holding unit being provided on the guide rail and the transverse drive being connected to the holding unit to drive the holding unit to move along the guide rail, allowing more flexible sliding of the holding unit.

In one of the embodiments, the rotary drive comprises two second telescopic cylinders.

Both second telescopic cylinders are connected to the same side of the holding component and spaced apart from each other, which alternately drives the holding component to rotate towards the polishing component along the plane of the workbench, facilitating polishing of multiple curved surfaces of the objects and balancing of the holding unit. As a result, shaking and falling of the objects during the polishing process are prevented.

In one of the embodiments, the rotating unit comprises a workpiece rotating shaft connected to the first gripping portion and positioned on the side of the first gripping portion facing the second gripping portion, the end portion of the workpiece rotating shaft facing an end portion of the second gripping portion.

The rotating drive is connected to the workpiece rotating shaft and drives the workpiece rotating shaft to rotate. The gripping drive unit drives the second gripping portion to rotate along the plane of the baseplate, allowing more convenient and even automated gripping (holding) and releasing operations of the objects with high efficiency. The design of the rotating components allows automated rotation of the objects during polishing so as to receive multi-area and multi-angle polishing without manual intervention, rendering high polishing efficiency In one of the embodiments, the polishing component comprises a polishing shaft and a polishing wheel, the axis of the polishing shaft being parallel to the axis defined by a line connecting the end portions of the first gripping portion and the second gripping portion when the second gripping portion rotates to where an end portion of the second gripping portion is facing the first gripping portion.

The polishing wheel is connected to an end portion of the polishing shaft and the polishing drive is connected to the other end portion of the polishing shaft, driving the polishing shaft to the rotate. As a result, the contact between the polishing wheel and the objects, as well as the detachment and installation of the polishing wheel, is facilitated.

A multi-angle automated polishing method is also disclosed herein, comprising the following steps:

placing an object to be polished on a holding component of a holding unit, and controlling by a control unit a transverse drive to drive the holding component to move transversely along the plane of the workbench to contact a polishing component of a polishing unit;

controlling by the control unit, a polishing drive to drive the polishing component to rotate; controlling, by the control unit, a translational drive to drive the holding unit to move translationally along the plane of the workbench, and meanwhile controlling a rotary drive to drive the holding unit to move transversely along the plane of the workbench; controlling by the control unit a rotating drive to drive the rotating unit to rotate so as to bring the object to be polished to rotate, while controlling, by the control unit, according to a surface curvature of the object to be polished, the rotary drive to drive the holding unit to move back and forth relative to the direction in which a hinged plate faces the polishing component, causing the sides of the objects to be polished to contact and rub on the polishing component from one end portion to the other for the purpose of polishing; resetting by the control unit the polishing component; and receiving the object polished.

The multi-angle automated polishing system as disclosed herein requires only simple equipments, easy operations, and low labour intensity. Manual intervention during the polishing process can be substantially spared, which allow reduction of labour intensity and the labour costs to a large degree as well as protection for the health of polishing workers. Furthermore, the multi-angle automated polishing method disclosed herein may accomplish multi-area and multi-angle polishing automatically with low manual intervention, high precision, and good polishing effects.

Figure 1:
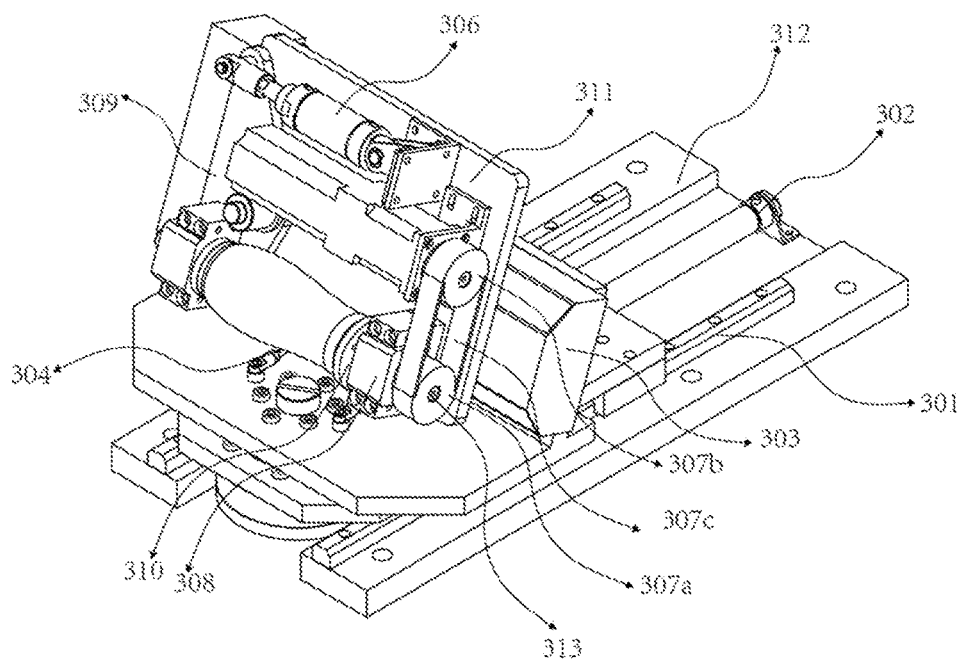
FIG. 1 shows a front view of a holding unit according to the first embodiment of the present disclosure.
Figure 2:
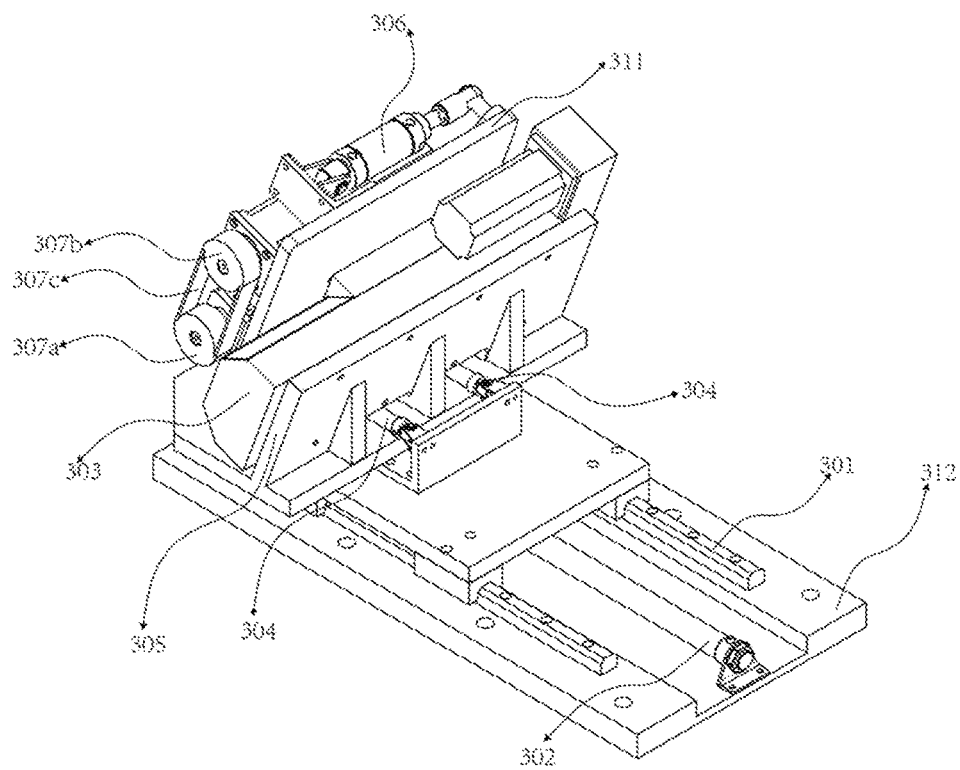
FIG. 2 shows a rear view of the holding unit according to the first embodiment of the present disclosure.
Figure 3:
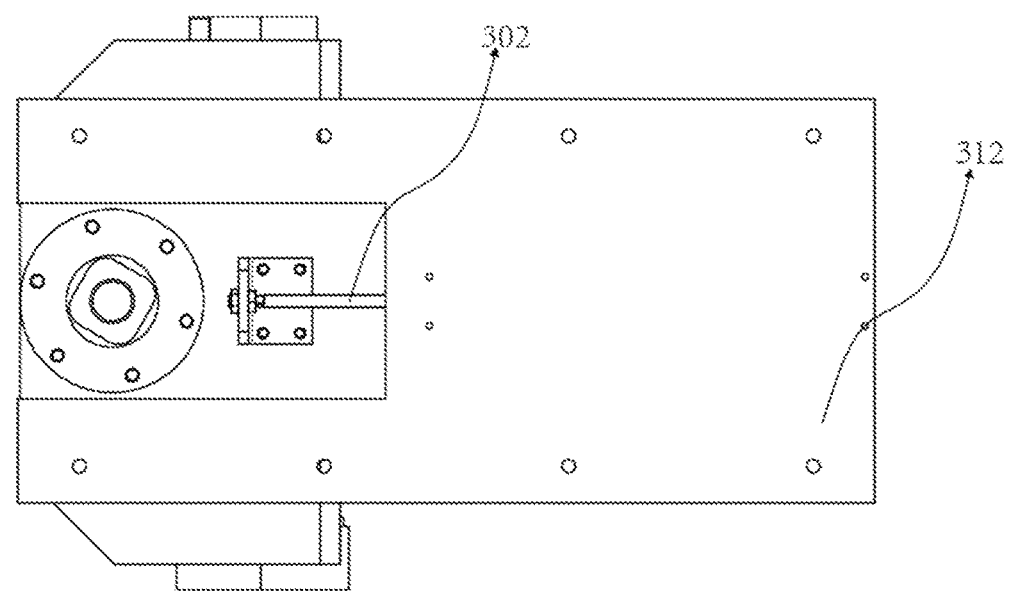
FIG. 3 shows a bottom view of the holding unit according to the first embodiment of the present disclosure.
Figure 4:
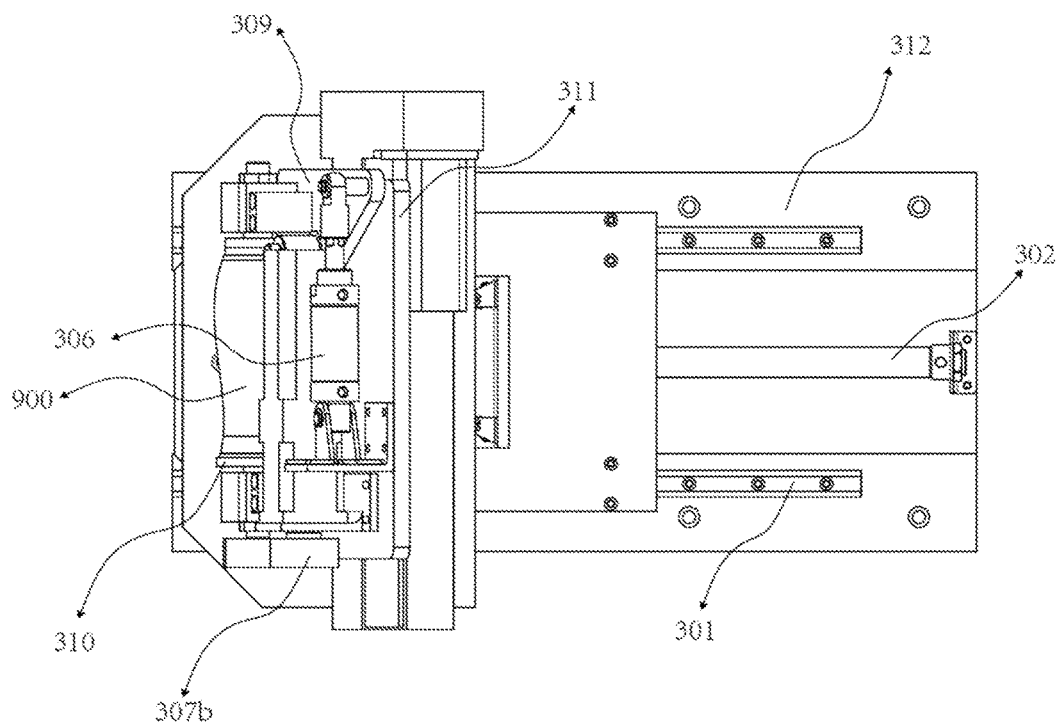
FIG. 4 shows a top view of the holding unit according to the first embodiment of the present disclosure.
Figure 5:
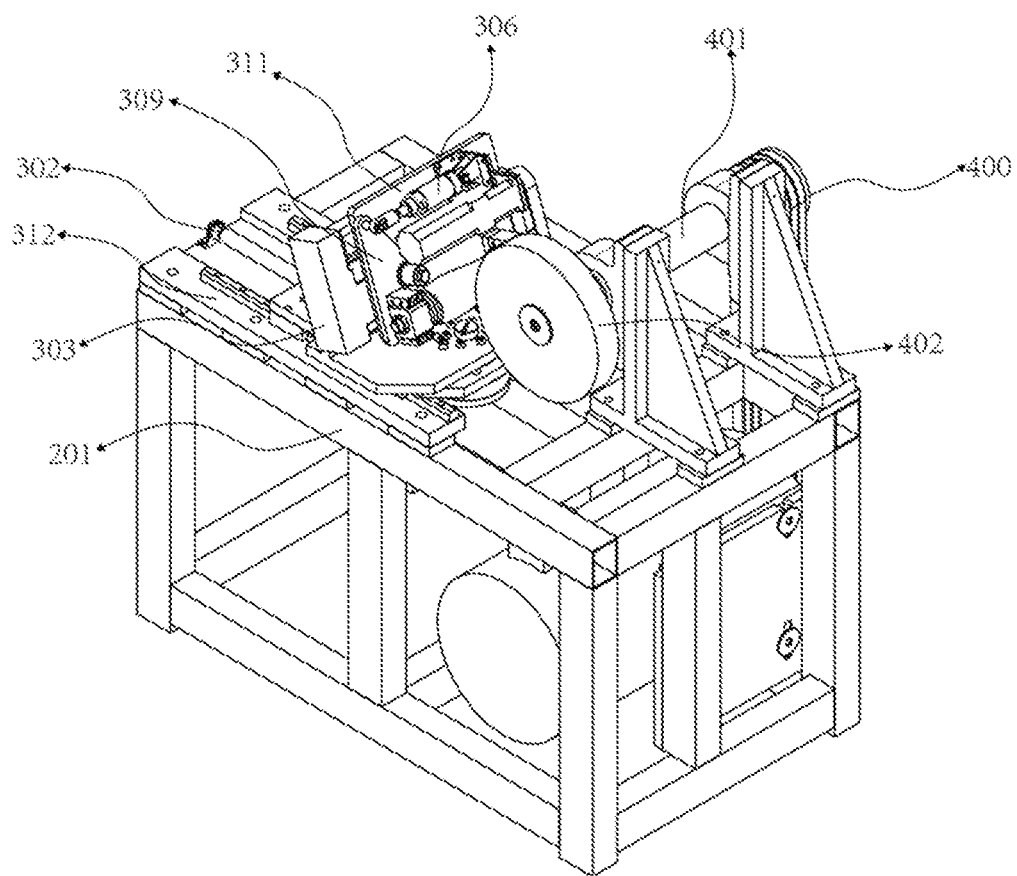
FIG. 5 shows a front view of the holding unit and polishing unit according to the first embodiment of the present disclosure.
Figure 6:
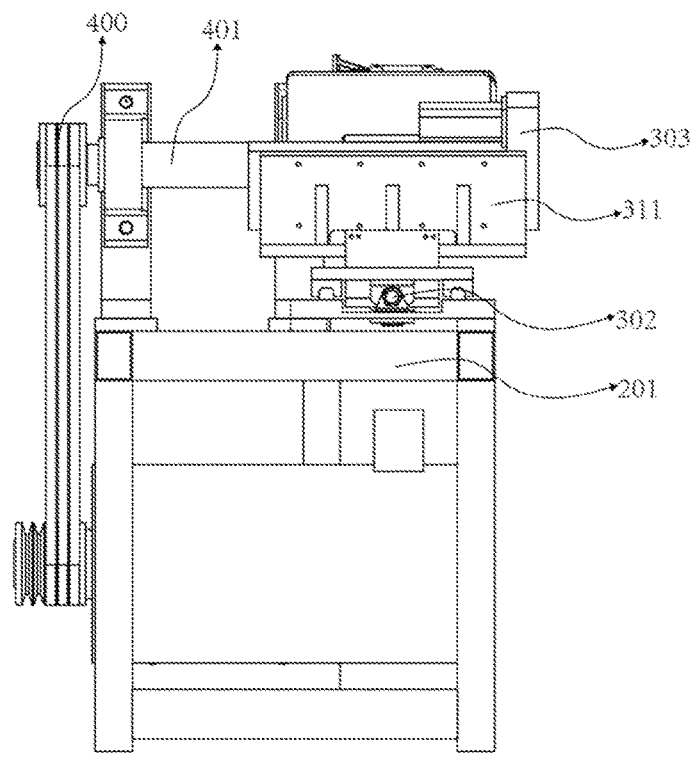
FIG. 6 shows a side view of the holding unit and polishing unit according to the first embodiment of the present disclosure.
Figure 7:
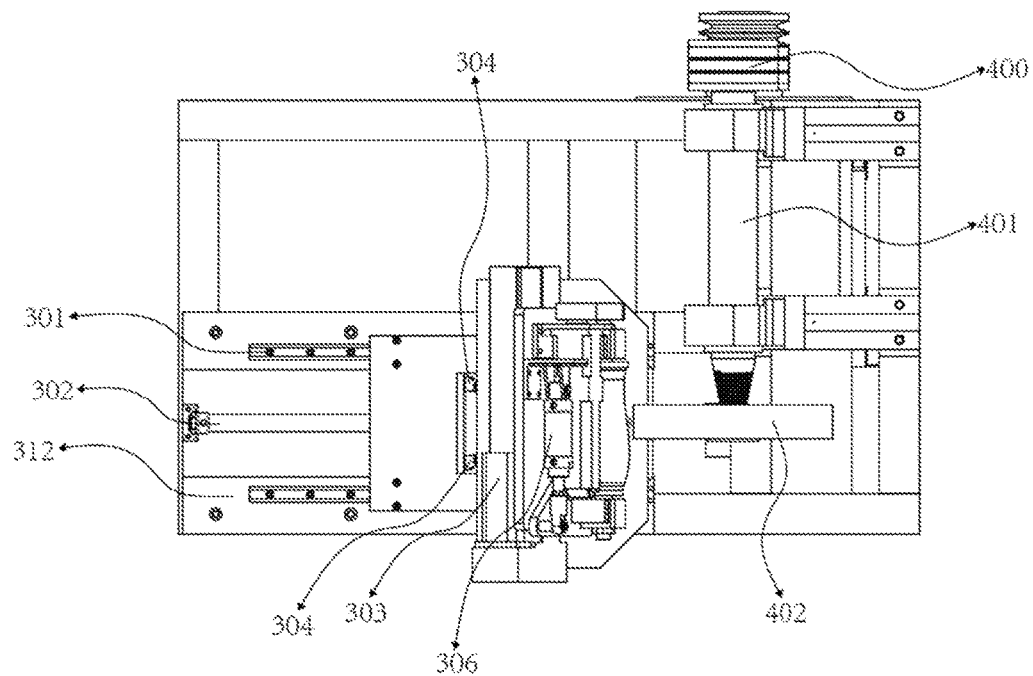
FIG. 7 shows a top view of the holding unit and polishing unit according to the first embodiment of the present disclosure.
Figure 8:
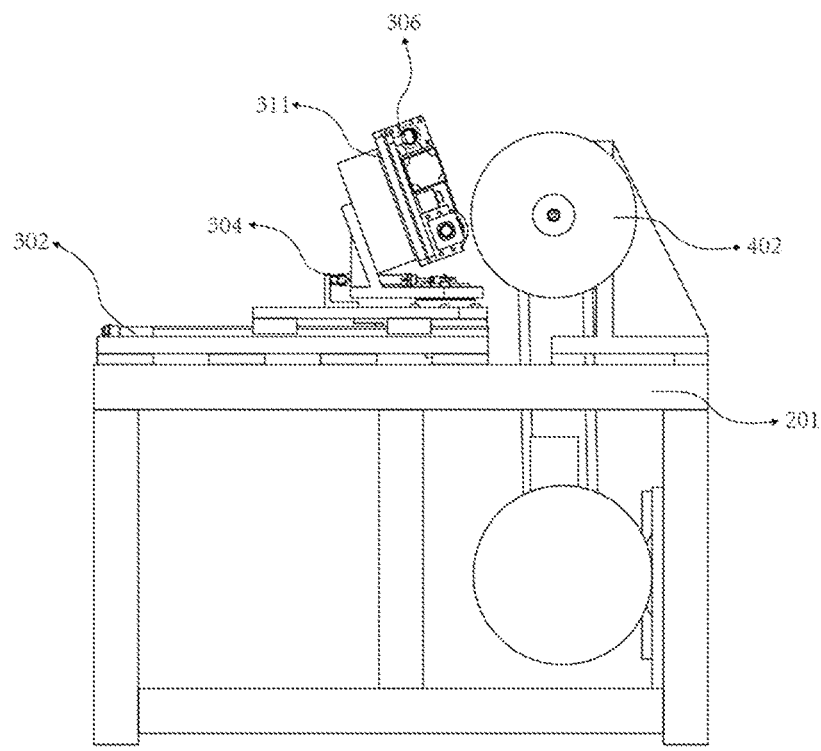
FIG. 8 shows a side view of the holding unit and polishing unit according to the first embodiment of the present disclosure.
Figure 9:
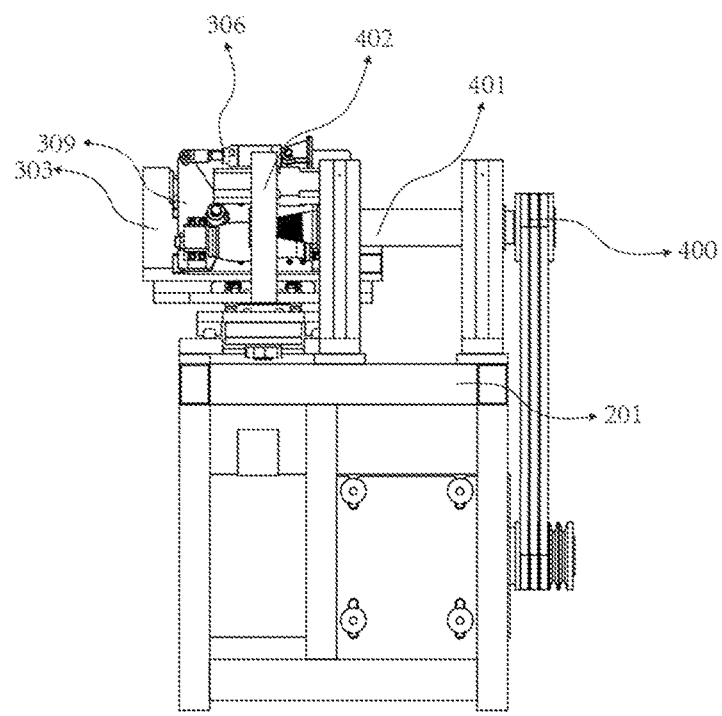
FIG. 9 shows a side view of the holding unit and polishing unit according to the first embodiment of the present disclosure.
Figure 10:
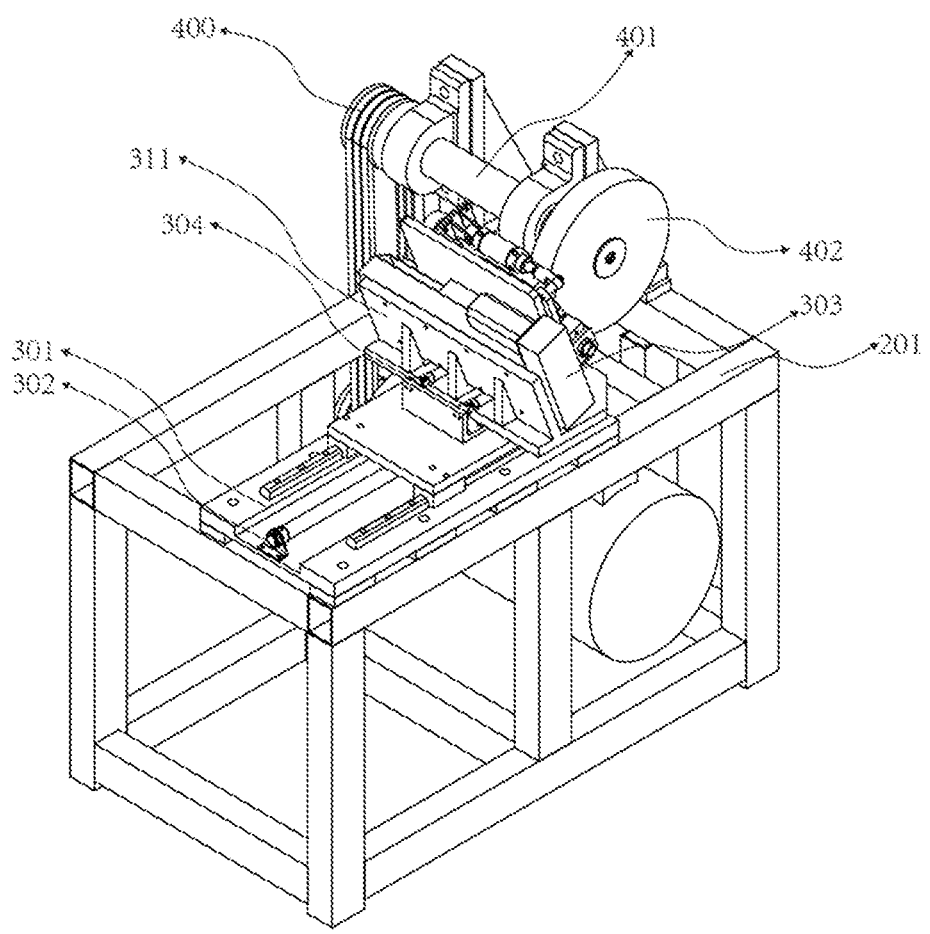
FIG. 10 shows a front view of the holding unit and polishing unit according to the first embodiment of the present disclosure.
Figure 11:
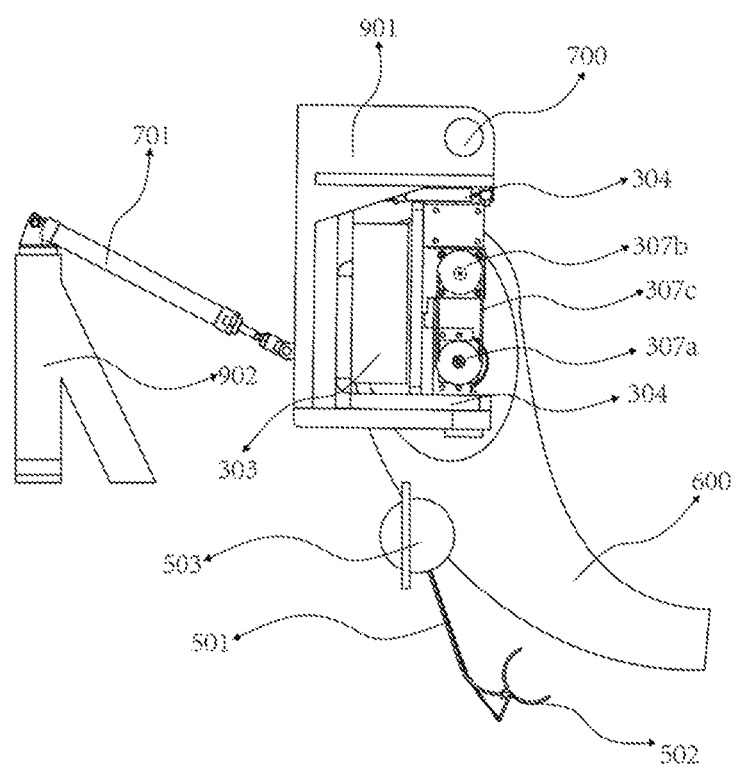
FIG. 11 shows a front view of a holding unit and an automated receiving unit according to the second embodiment of the present disclosure.
Figure 12:
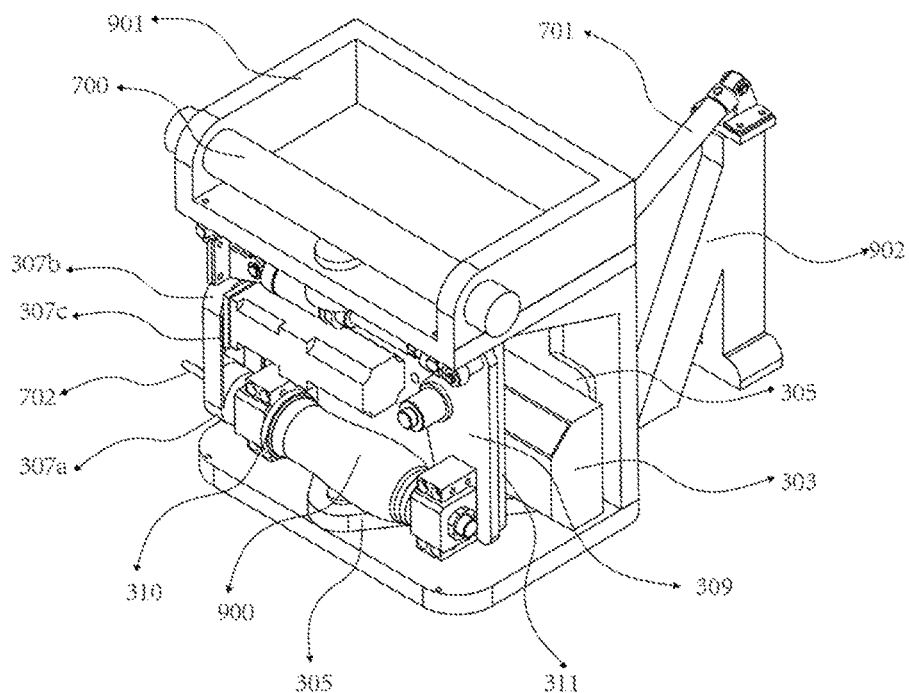
FIG. 12 shows a front view of the holding unit according to the second embodiment of the present disclosure.
Figure 13:
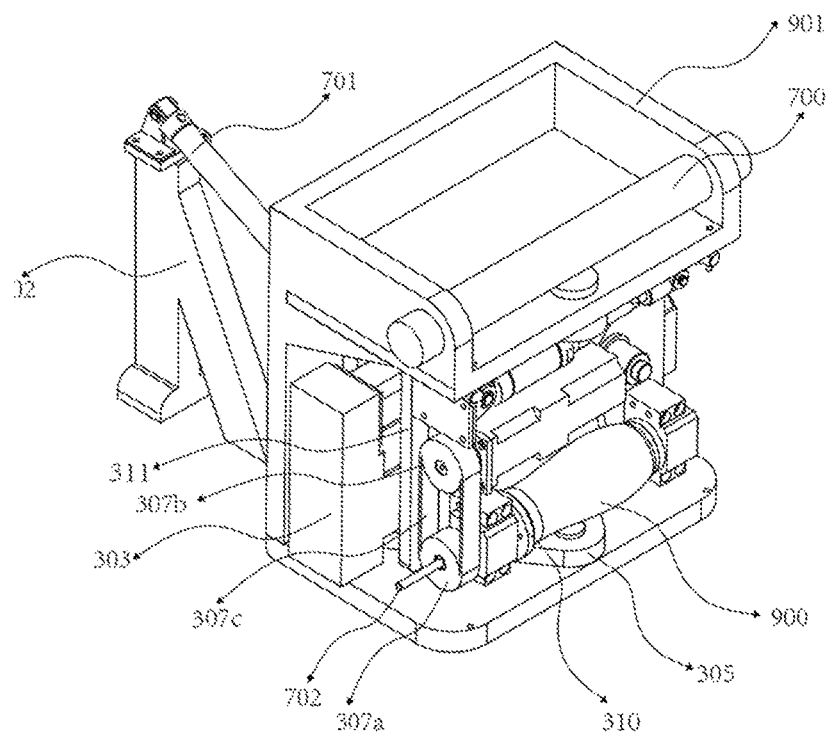
FIG. 13 shows another front view of the holding unit according to the second embodiment of the present disclosure.
Figure 14:
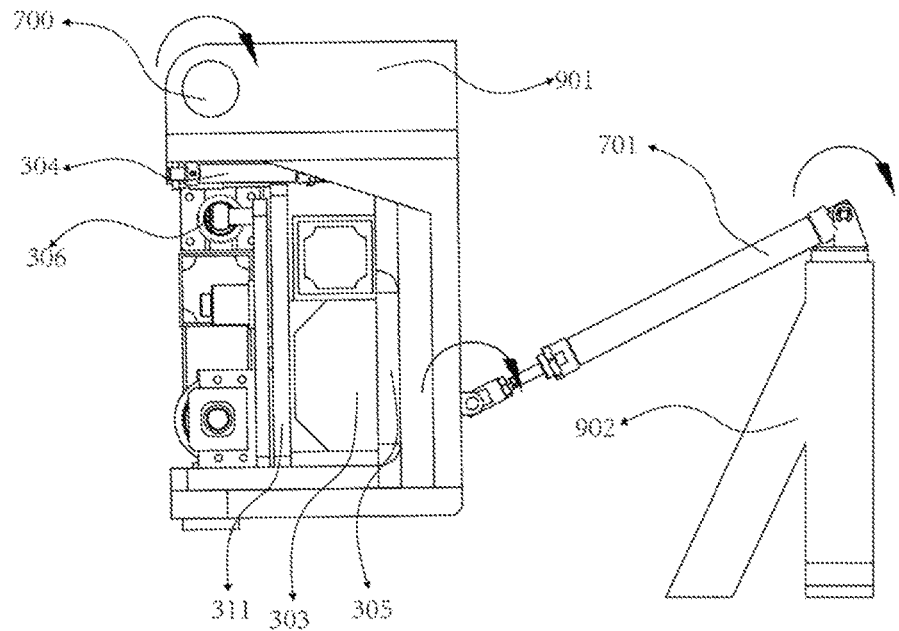
FIG. 14 shows a side view of the holding unit according to the second embodiment of the present disclosure.
Figure 15:
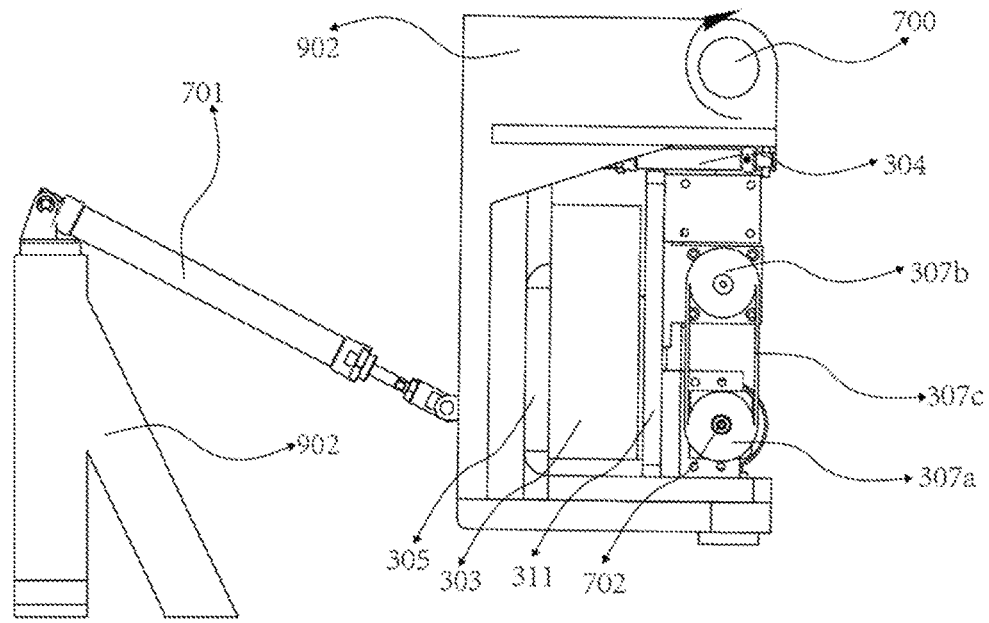
FIG. 15 shows a side view of the holding unit according to the second embodiment of the present disclosure.
Figure 16:
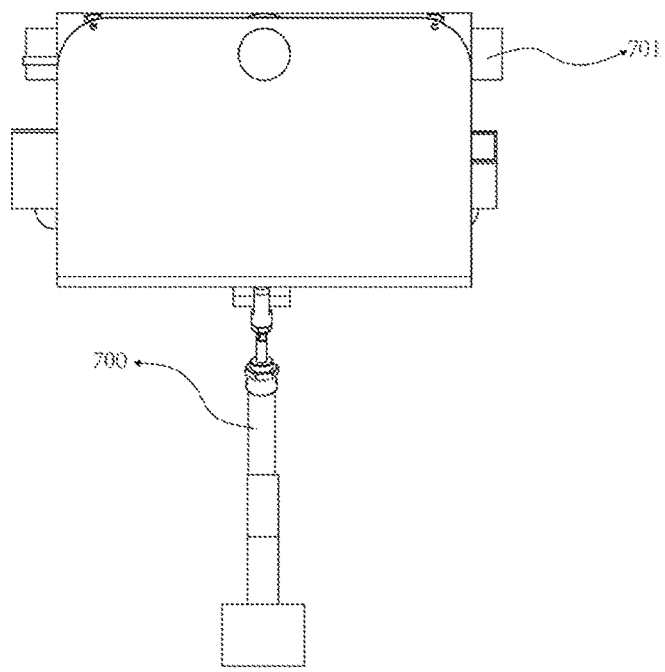
FIG. 16 shows a bottom view of the holding unit according to the second embodiment of the present disclosure.
Figure 17:
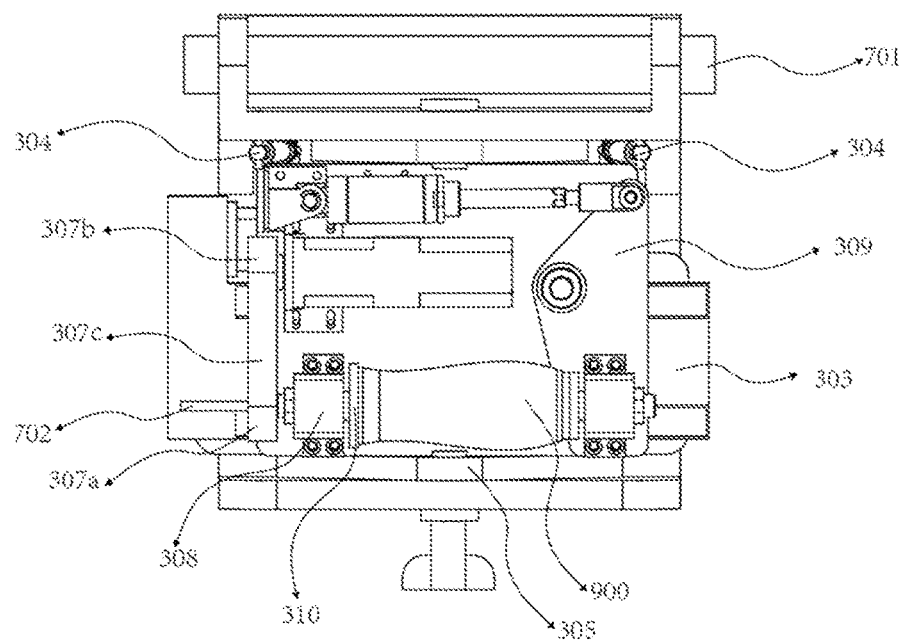
FIG. 17 shows a top view of the holding unit according to the second embodiment of the present disclosure.
Figure 18:
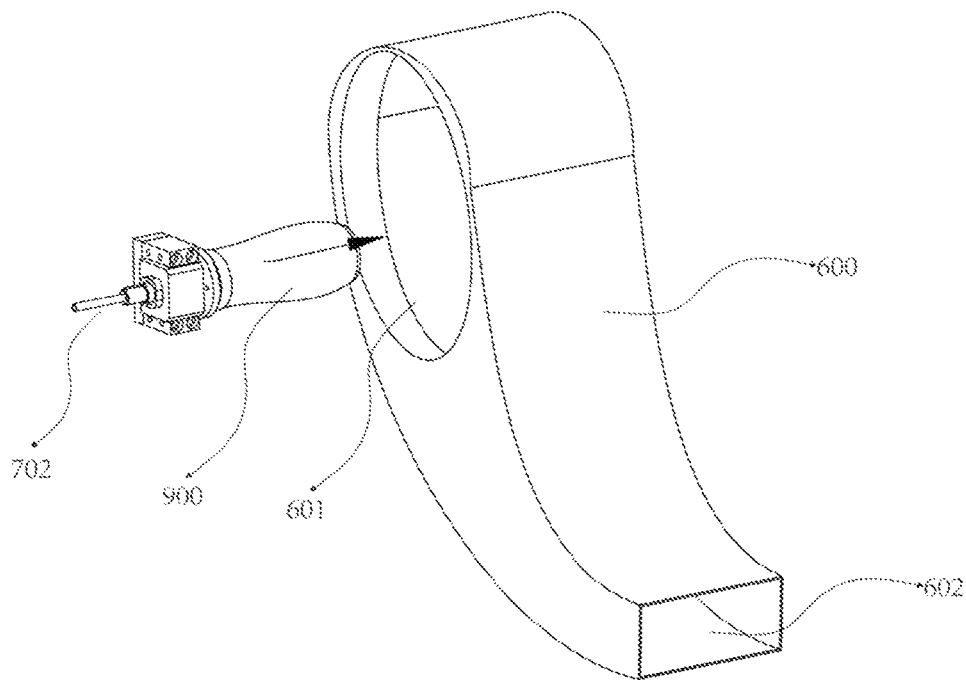
FIG. 18 shows a front view of the automated receiving unit according to the first and second embodiments of the present disclosure.
Figure 19:
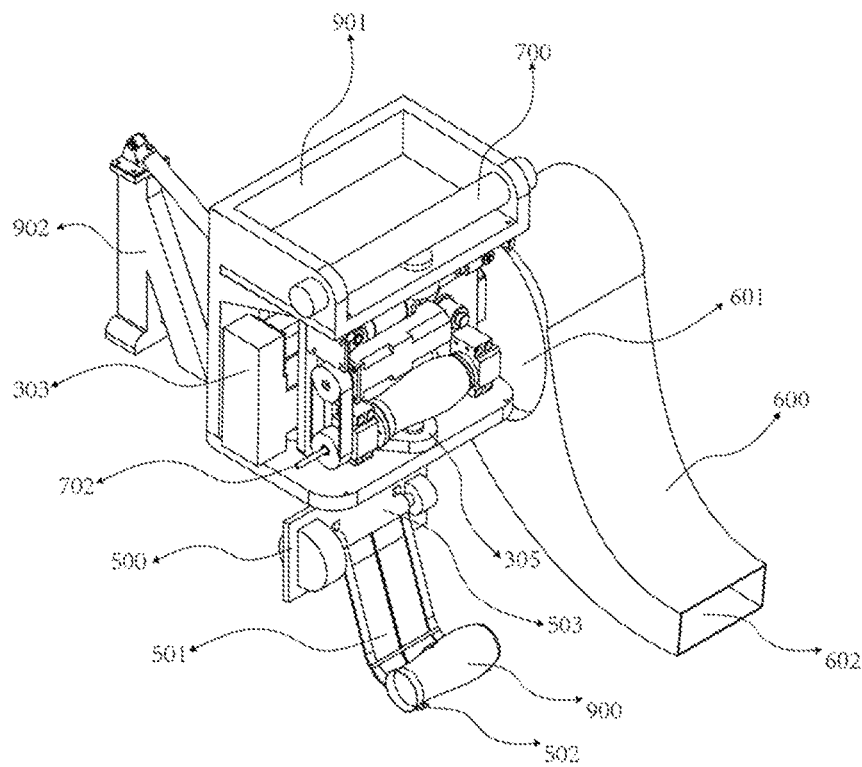
FIG. 19 shows a front view of the holding unit and the automated receiving unit according to the second embodiment of the present disclosure.
Figure 20:
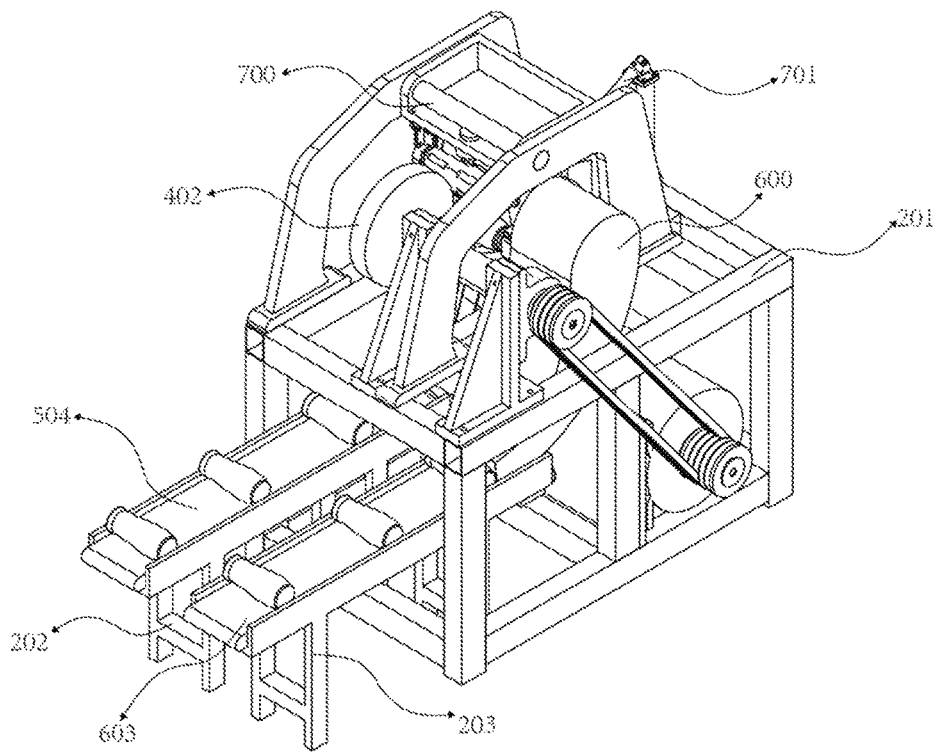
FIG. 20 shows a front view of a multi-angle automated polishing system according to the second embodiment of the present disclosure.
Figure 21:
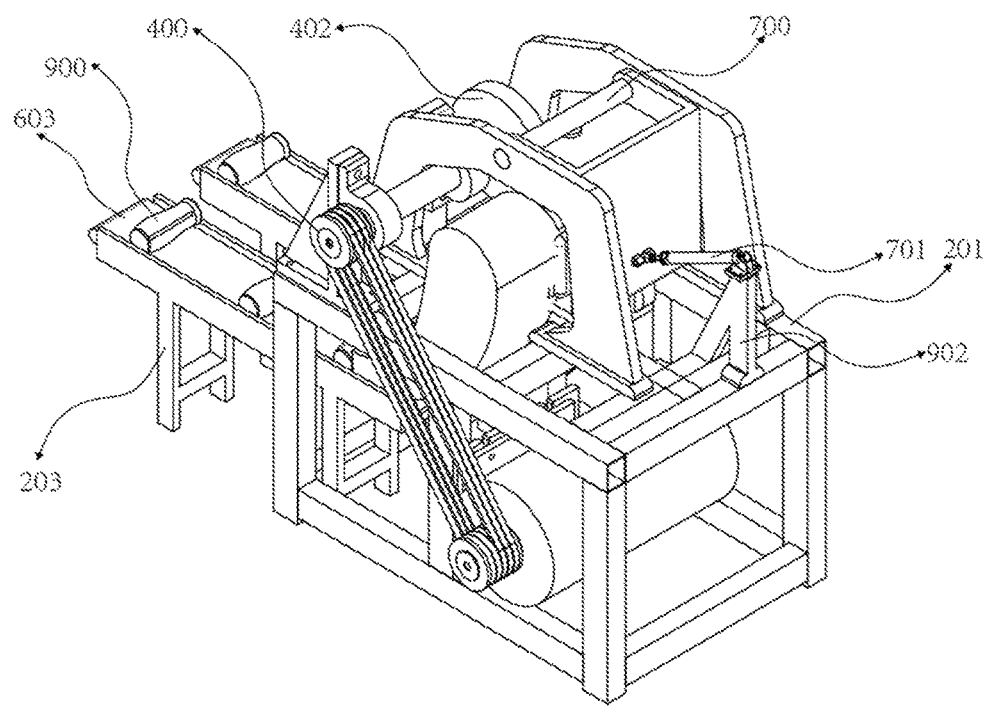
FIG. 21-23 show a front view of the multi-angle automated polishing system according to the second embodiment of the present disclosure.
Figure 22:
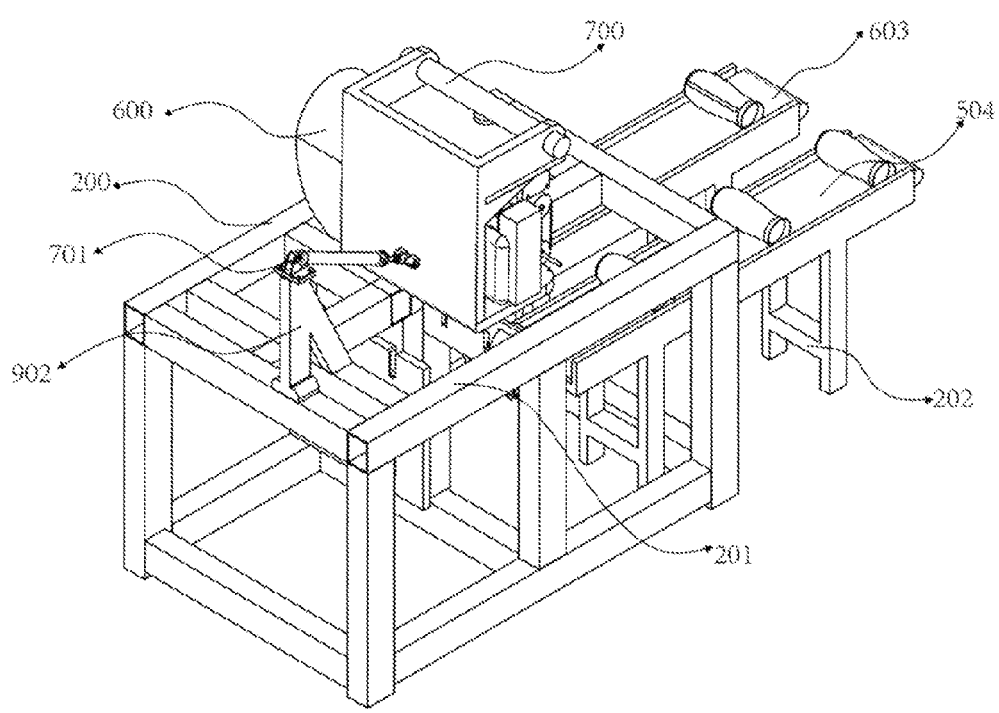
Figure 23:
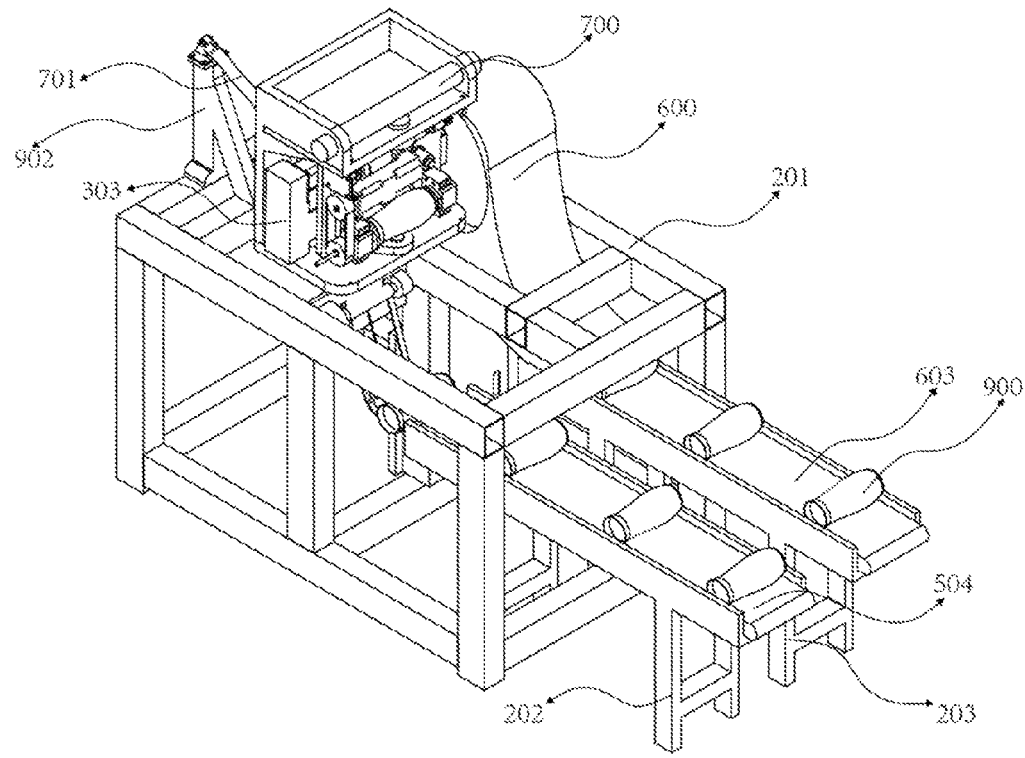
Figure 24:
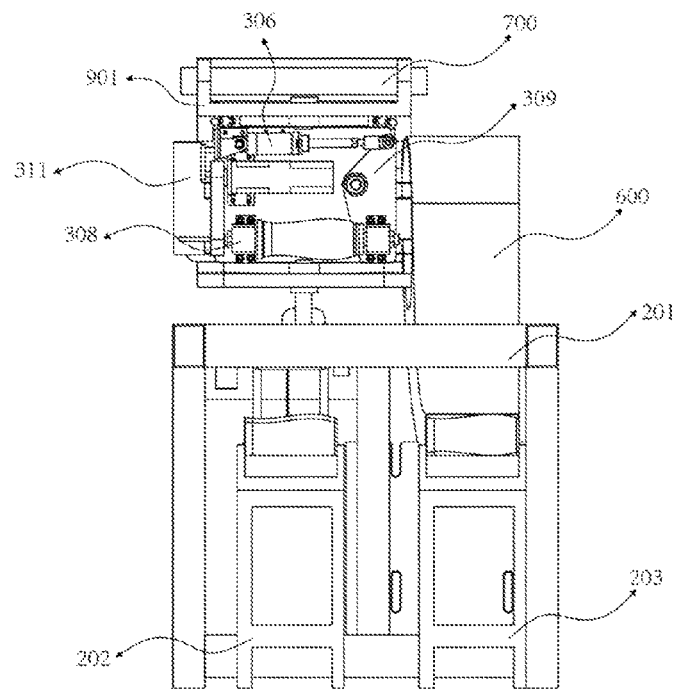
FIG. 24-27 show a side view of the multi-angle automated polishing system according to the second embodiment of the present disclosure.
Figure 25:
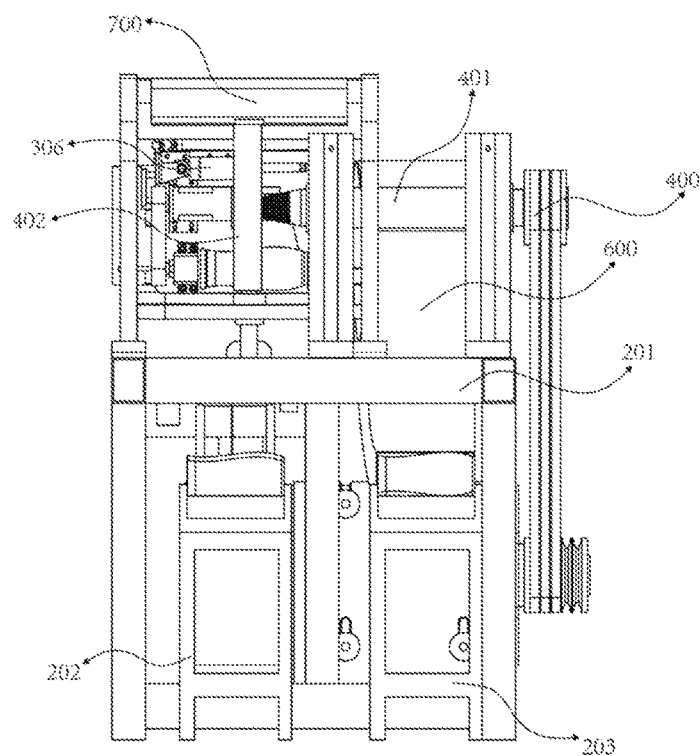
Figure 26:
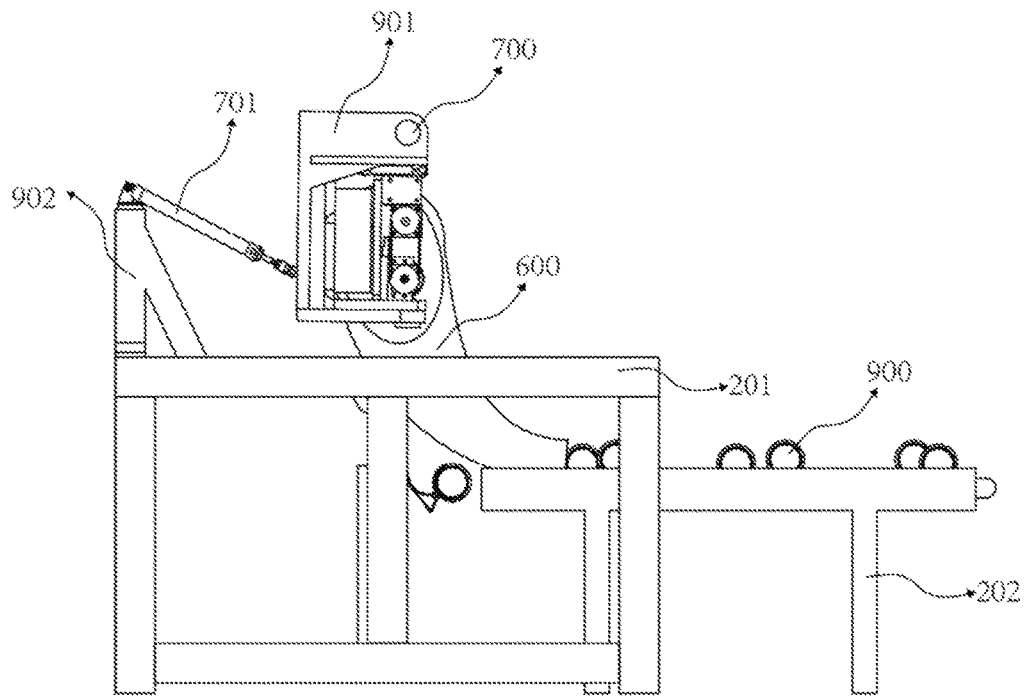
Figure 27:
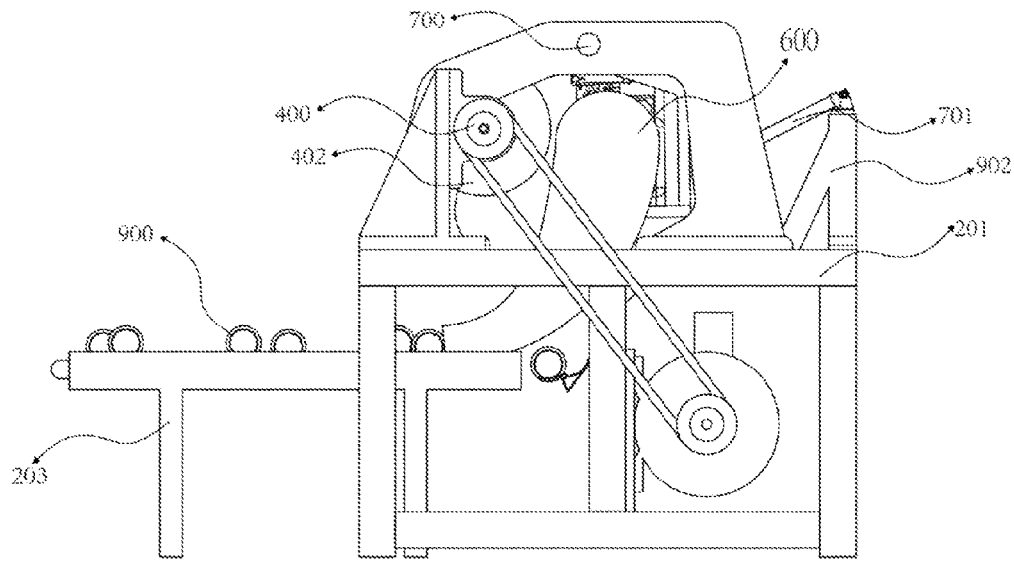

DESCRIPTION OF REFERENTIAL SIGNS IN THE DRAWINGS 100. shell; 101. inlet; 102. outlet; 103. air inlet; 104. control panel; 201. workbench; 202. second stand; 203. third stand; 300. 300a. holding unit; 301. guide rail; 302. transverse drive; 303. translational drive; 304. second telescopic cylinder; 305. hinge plate; 306. first telescopic cylinder; 307a. driven wheel; 307b. driving wheel; 307c. belt; 308. first gripping portion; 309. gripping plate; 310. rotating support component; 311. baseplate; 312. base fixing plate; 313. workpiece rotation shaft; 400. polishing drive; 401. polished shaft; 402. polishing wheel; 500. fixed portion; 501. feeding unit; 502. reclaiming claw; 503. feeding drive; 504. feeding transferring surface; 600. guide groove; 601 receiving port; 602. discharge port; 603. receiving transferring surface; 700. rotating shaft; 701. propulsion drive; 702. suction port; 800. rinsing unit; 900. steel cylinder; 901. support frame; 902. bracket.

DETAILED DESCRIPTION OF EMBODIMENTS

Detailed description will be given below with reference to the accompanying figures to facilitate understanding of the present application. Preferred embodiments are shown in the figures. However, the present application may be implemented in various ways, without being limited to the examples presented in the description. The purpose of these embodiments is merely for illustration and better comprehension of the present disclosure.

Please note that, a component that is "fixed on" another component may refer to a component directly fixed on another component, or with an intermediate component in between. Similarly, a component that is "connected to" another component may refer to a component directly connected to another component, or with an intermediate component in between.

Unless otherwise noted, all the technical and scientific terms herein shall be understood as having the same meaning with those commonly accepted by a person skilled in the art. Such terms, as used herein, are for the purpose of describing specific embodiments of, without limiting, the present application. The term "and/or" as used herein refers to any and all combinations of one or more items recited.

Example 1

A multi-angle automated polishing system according to this example may comprise a workbench 201, a holding unit 300, a polishing unit, an automated feeding system, an automated receiving system, and a control unit. The upper surface of the workbench 201 is in a horizontal plane.

Refer to FIG. 1 through 4. The holding unit 300 comprises a hinge plate 305, a holding component for holding objects, a transverse drive 302 configured to drive the holding component to move transversely along the plane of the workbench 201, a translational drive 303 configured to drive the holding component to move translationally along the plane of the workbench 201, and a rotary drive configured to drive the holding component to rotate transversely along the plane of the workbench 201.

In this embodiment, preferentially, the holding component comprises a baseplate 311, a first gripping portion 308, and a gripping plate 309. The first gripping portion 308 is fixed to the baseplate 311. The first gripping portion 308 has a bearing assembly configuration to cooperate with the rotation of the workpiece rotation shaft 313. The section of the hinge plate 305 in the axial direction has an "L" shape. The baseplate 311 is hinged to one side of the bottom of the hinge plate 305, so that the rotary drive can drive the baseplate 311 to rotate the holding component towards the polishing component (in the direction towards the polishing wheel 402) back and forth. In other words, the holding component is driven to rotate transversely along the plane of the workbench 201 (horizontally). The rotary drive is positioned at the base of the holding component.

In this example, the rotary drive comprises two second telescopic cylinders 304, both positioned at the base of the holding component (the base of the baseplate 311 as illustrated in the figure of this embodiment) connected to the same side of the holding component and spaced from each other. The two second telescopic cylinders 304 alternately drive the holding component to rotate towards the polishing component along the plane of the workbench. In other words, when one of the second telescopic cylinders 304 extends and drives the holding component to rotate towards the polishing unit (the polishing wheel 402 of the polishing component), the other second telescopic cylinder 304 stands by. The two second telescopic cylinders 304 extends and contracts in accordance with the surface curvature of the objects.

A second gripping portion comprises a gripping plate 309 and a bearing assembly configuration, the bearing assembly being fixed to an end portion of the gripping plate 309, and the bearing assembly at an end portion of the gripping plate 309 being facing the bearing assembly of the first gripping portion 308, cooperating with the rotation of the workpiece rotation shaft 313 in order to rotate the objects to be polished 900. The intermediate portion of the gripping plate 309 is hinged to the baseplate 311. The holding unit 300 further comprises a second gripping portion drive which drives the gripping plate 309 to rotate in the direction of the plane of the baseplate 311. When the gripping plate 309 rotates to where an end portion of the gripping plate 309 faces the first gripping portion 308, the distance between the end portions of the first gripping portion 308 and the gripping plate 309 matches the dimensions of the objects.

When an end portion of the gripping plate 309 faces the first gripping portion 308, the axis defined by a line connecting the end portions of the first gripping portion 308 and the gripping plate 309 is parallel to the plane of the workbench 201 while perpendicular to the direction in which the holding component moves transversely along the plane of the workbench.

The second gripping portion drive comprises a telescopic shaft and a first telescopic cylinder 306 configured to drive the telescopic shaft in a telescopic motion, the first telescopic cylinder 306 being hinged to the baseplate 311 so that the first telescopic cylinder 306 rotates in the direction of the plane of the baseplate 311. An end portion of the telescopic shaft is connected to an end portion of the gripping plate 309, the other end portion of the telescopic shaft being connected to the first telescopic cylinder 30. The telescopic shaft is in the same plane with the first gripping portion 308 and the gripping plate 309 and positioned between the first gripping portion 308 and the gripping plate 309. The telescopic shaft, when extended, drives an end portion of the gripping plate 309 to rotate towards the first gripping portion 308, and, when contracted, drives an end portion of the gripping plate 309 to rotate away from the first gripping portion 308. The end portions of the first gripping portion 308 and the gripping plate 309 are both provided with polyurethane spacer to increase friction force.

The holding unit 300 further comprises a workpiece rotation shaft 313, the workpiece rotation shaft 313 being connected to the first gripping portion 308 and positioned on the side of the first gripping portion 308 facing the gripping plate. The holding unit 300 further comprises a rotating drive configured to drive the workpiece rotation shaft 313 to rotate in the direction perpendicular to the planes of the workbench 201 and the base. The workpiece rotation shaft 313 comprises rotating support component 310 (polyurethane material) and extends through the end portion of the first gripping portion 308. The rotating support component 310 is fixed to the workpiece rotation shaft 313 on the end portion of the first gripping portion 308 and held in place with the inner rim of the bearing. The portion of the rotating support component 310 contacting the objects to be polished 900 is made of polyurethane material to increase friction force. The workpiece rotation shaft 313 on the other end of the first gripping portion 308 is connected to the rotating drive. The rotating drive comprises a driving wheel 307b, a driven wheel 307a, and a belt 307c. The driven wheel 307a is fixed on the workpiece rotation shaft 313 on the other end of the first gripping portion 308 and connected to the driven wheel 307 through the belt 307c. The driving wheel 307b is under the control of the first motor (not shown). The control unit controls the first motor to operate in order to rotate the driven wheel 307 and thus the workpiece rotation shaft 313.

The polishing unit comprises a polishing component and a polishing component configured to drive the polishing drive 400. The polishing component comprises a polishing shaft 401 and a polishing wheel 402, the polishing shaft 401 being positioned above the workbench 201, opposite to the holding unit 300. When the gripping plate 309 rotates to where the end portion of the gripping plate 309 faces the first gripping portion 308, the axis of the polishing shaft 401 is parallel to the axis defined by a line connecting the end portions of the first gripping portion 308 and gripping plate 309. The polishing wheel 402 is connected to an end of the polishing shaft 401, while the polishing drive 400 is connected to the other end of the polishing shaft 401 and drives the rotation of the polishing shaft 401. The polishing drive 400 is a second motor, e.g., an alternating current motor in this embodiment.

Further, the holding unit 300 is fixed to the base fixing plate 312 and further comprises guide rail 301. The base fixing plate 312 is connected to the guide rail 301. The transverse drive 302 is connected to the holding unit 300 to drive the base fixing plate 312 in order to move the holding unit 300 along the guide rail 301.

Refer to FIG. 5 through 10. In this embodiment, the polishing shaft 401 is positioned above the plane of the workbench 201. The guide rail 301 is positioned on the surface the workbench 201 and operates in a direction perpendicular to the axis of the polishing shaft 401. The axis defined by a line connecting the end portions of the first gripping portion 308 and the gripping plate 309 is parallel with the axis of the polishing shaft 401. One side of the base of the baseplate 311 forms an acute angle with the plane of the workbench 201. The plane of the baseplate 311 is parallel to the axis of the polishing shaft 401. The transverse drive 302 drives the holding component to move back and forth towards the polishing shaft 401 along the long axis of the guide rail 301 in the plane of the workbench 201. The translational drive 303 drives the holding component to move in a direction perpendicular to the long axis of the guide rail 301 in (or parallel to) the plane of the workbench 201. The rotary drive drives the holding component to rotate in (or parallel to) the plane of the workbench 201. The gripping plate 309 rotates in the direction perpendicular to the planes of the baseplate 311 and the workbench 201. The first gripping portion 308 opens when rotating upwards and closes when rotating downwards. The telescopic shaft is positioned above the baseplate 311, relative to the first gripping portion 308 and the gripping plate 309. The extending and contracting direction of the telescopic shaft is parallel to the polishing shaft 401. The workpiece rotation shaft 313 rotates around the direction parallel to the polishing shaft 401. In other words, when the gripping plate 309 rotates to where the end portion of the gripping plate 309 faces the first gripping portion 308, the workpiece rotation shaft 313 rotates around the axis formed by the axis defined by a line connecting the end portions of the first gripping portion 308 and the gripping plate 309.

Refer to FIG. 11 and FIG. 19 through 29. The automated feeding system comprises a fixed portion 500 connected to the workbench 201 and further comprises a feeding unit and a clamping unit. The fixed portion 500 is positioned under the workbench 201 in the vertical direction. The base of the fixed portion 500 has two bulges spaced away from each other.

The feeding unit comprises the feeding unit 501 that is elongated in shape. The feeding unit further comprises a feeding drive 503 configured to drive the feeding unit 501 to rotate around the fixed portion 500 vertically.

The clamping unit comprises a reclaiming claw 502 that is connected to the feeding unit 501 and an opening and closing drive (not shown) configured to drive the reclaiming claw 502 to open and close. The reclaiming claw 502 comprises at least two reclaiming arms of circular arc shape and spaced away from each other to contain objects in between. One end of the reclaiming arm is hinged to the feeding unit 501, and the other end bends towards the space between the reclaiming arms.

The feeding unit 501 is hinged between the two bulges via the workpiece rotation shaft 313 on an end of the long axis of the feeding unit 501, so that the feeding unit 501 is hinged to the fixed portion 500. The feeding drive 503 is connected to the workpiece rotation shaft 313 and drives the workpiece rotation shaft 313 to rotate. The feeding drive 503 drives the feeding unit 501 to rotate vertically. The reclaiming claw 502 is oriented to the surface of the workbench 201 and positioned between the end portions of the first gripping portion 308 and the gripping plate 309. The other end of the long axis of the feeding unit 501 is provided with a reclaiming arm. The end of the feeding unit 501 at which the reclaiming claw 502 is positioned bends towards the hinge point between the feeding unit 501 and the fixing base.

Figure 28:
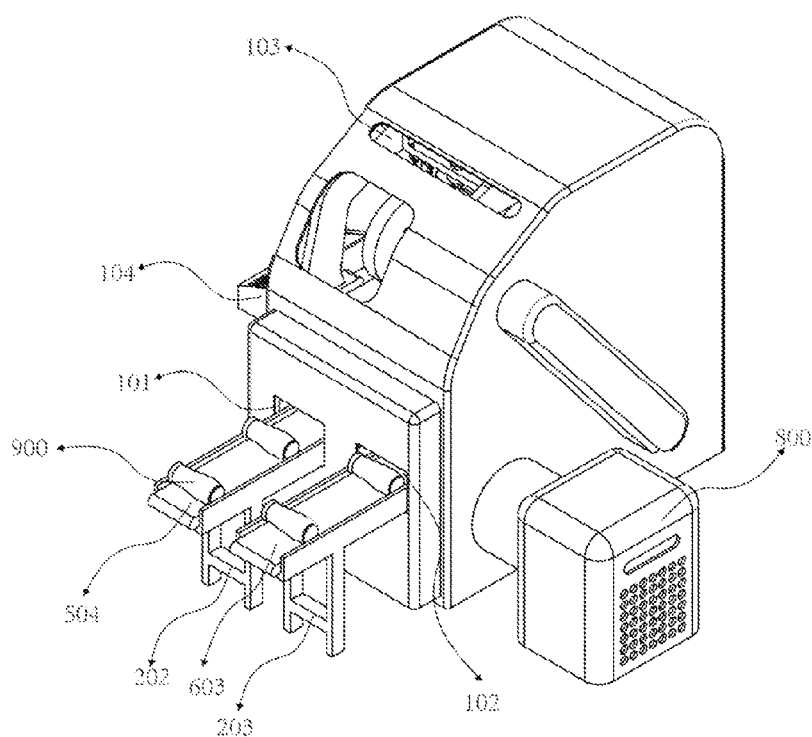
FIG. 28-29 show a front view of the multi-angle automated polishing system and a shell according to the second embodiment of the present disclosure.
Figure 29:
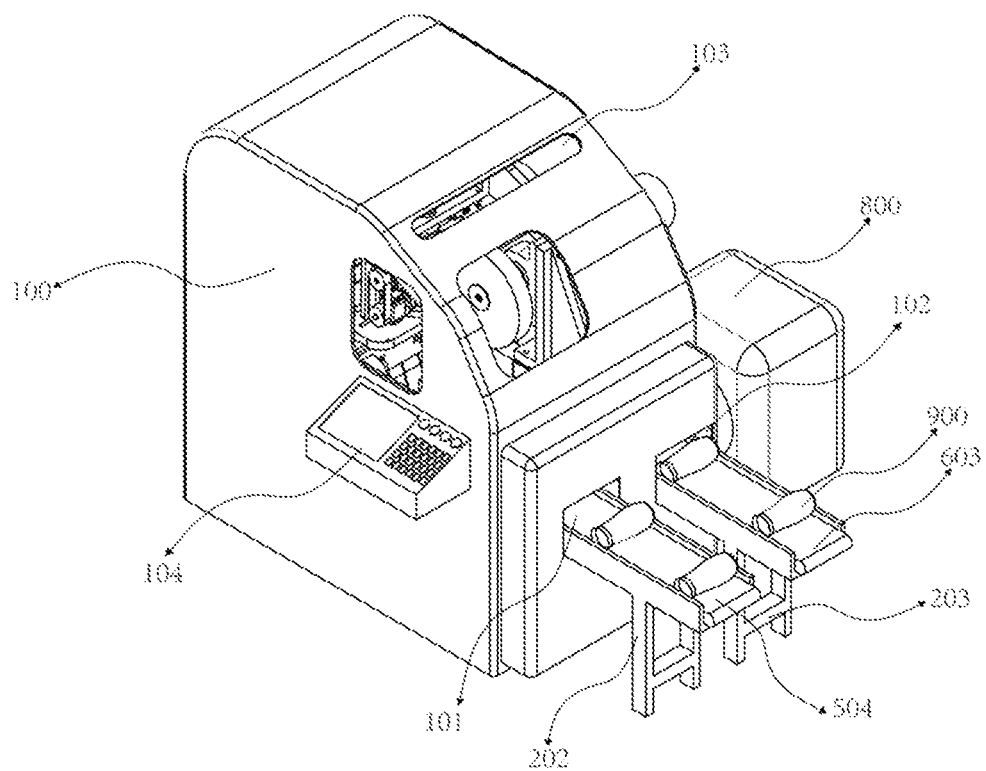

Refer to FIGS. 28 and 29. Furthermore, a feeding unit is included. The feeding unit comprises a feeding transfer surface 504 and a feeding transferring drive configured to drive the feeding transfer surface 504 in motion. The reclaiming claw 502 is positioned vertically under the feeding transfer surface 504. The moving direction of the feeding transfer surface 504 is in the plane where the feeding unit 501 rotates. Either side of the feeding transfer surface 504 along its operation direction comprises a baffle, the space between which is no less than the dimensions of the objects. In this embodiment, the feeding transfer surface 504 has an elongated shape and is positioned on the base of the second stand 202. The base of the second stand 202 comprises an elongated groove, the dimensions of the groove matching the feeding transfer surface 504. The feeding transfer surface 504 is positioned in the elongated groove, the side walls of which forms side baffles that prevent the objects from falling.

Refer to FIG. 11 and FIG. 18 through 29. The automated receiving system comprises a receiving unit and a suction unit.

The receiving unit comprises a guide groove 600, which comprises a receiving port 601 and a discharge port 602. The receiving port 601 of the guide groove 600 opens on the side wall of the guide groove 600 and is circular in shape, with a curved bottom side. The dimensions of the guide groove 600 decreases along the direction from the receiving port 601 of the guide groove 600 to the discharge port 602.

The suction unit comprises a suction port 702 which opens on the end portion of the gripping plate 309 towards the first gripping portion 308. The first gripping portion 308 is on the same height vertically with the receiving port 601 of the guide groove 600. The first gripping portion 308 is oriented to the receiving port 601 of the guide groove 600, so that the suction port 702 is oriented to the receiving port 601 of the guide groove 600. The receiving port 601 of the guide groove 600 and the reclaiming claw 502 of the feeding unit 501 have the same orientation. The suction port 702 is in communication with an air intake system.

Furthermore, an air cleaning unit is also included. The air cleaning unit is connected to the suction port 702 of the suction unit. The air cleaning unit comprises an air intake filter for drying incoming air. The air intake filter is in communication with the suction port 702 of the suction unit. Ambient air is dried through the air intake filter.

Furthermore, a dust removing and filtration system is also included. The dust removing and filtration system comprises a powerful air extracting unit, a rinsing unit 800, and a liquid waste disposing unit. The dust removing and filtration system is in communication with an air inlet 103.

Furthermore, the receiving unit further comprises a receiving transfer surface 603 and a receiving transferring drive for the movement of the receiving transfer surface 603. The discharge port 602 of the guide groove 600 is positioned vertically above the receiving transfer surface 603 and oriented to the receiving transfer surface 603. Either side of the receiving transfer surface 603 along its operating direction comprises a baffle, with the space between the baffles no less than the dimensions of the objects. In this embodiment, the receiving transfer surface 603 is elongated in shape and positioned at the base of the third stand 203. The base of the third stand 203 comprises a groove, the dimensions of the groove matching the feeding transfer surface 504. The feeding transfer surface 504 is positioned in the elongated groove, the side walls of which forms side baffles that prevent the objects from falling.

The control unit controls the transverse drive 302, the translational drive 303, the rotary drive, the second gripping portion drive (the first telescopic cylinder 306), rotating drive, the polishing drive 400, the balance drive, the feeding drive 503, the feeding transferring drive, the receiving transferring drive, the opening and closing drive, and the suction unit.

In this embodiment, a shell 100 is also included. The shell 100 comprises an inlet 101 and an outlet 102, the inlet 101 and the outlet 102 being positioned on the same side of the shell 100. The shell 100 encloses the workbench 201, the holding unit 300, the polishing unit, the automated feeding system, the automated receiving system, and the control unit. The feeding transfer surface 504 extends through the inlet 101 of the shell 100 and the receiving transfer surface 603 extends through the outlet 102 of the shell 100. The external side of the shell 100 further comprises a control panel 104 connected to the control unit and a rinsing unit 800. The shell 100 further comprises an air inlet 103, with which the suction port 702 of the suction unit is in communication, via the air cleaning unit.

A polishing method using the multi-angle polishing system according to the present application is also disclosed herein, comprising:

placing steel cylinders 900 with a curved body (the objects to be polished) successively on the feeding transfer surface 504, with the bottoms of the steel cylinder 900 facing the receiving port 601 of the guide groove 600 (the first gripping portion 308) and the opening of the steel cylinder 900 facing the gripping plate 309; operating the control panel 104 so that the control unit controls the feeding transfer surface 504 to move towards the reclaiming claw 502;

when an steel cylinder 900 reaching where the reclaiming claw 502 of the feeding unit 501 is, the control unit controlling the opening and closing drive to drive the reclaiming claw 502 to open and, by the motion of the feeding transfer surface 504, causing the steel cylinder 900 to enter the space between the reclaiming claws 502, when the control unit further controls the opening and closing drive to drive the reclaiming claws 502 to close and grasp the steel cylinder 900;

the control unit controlling the feeding drive 503 to drive the feeding unit 501 and the reclaiming claw 502 to rotate vertically around the fixed portion 500 towards the holding unit 300, further transferring the steel cylinder 900 to the space between the end portions of the first gripping portion 308 and the gripping plate 309;

the control unit controlling the second gripping portion drive (the first telescopic cylinder 306) to drive the telescopic shaft to extend, so that the end portion of the gripping plate 309 rotates towards the first gripping portion 308, causing the steel cylinder 900 to be held tightly between the end portions of the first gripping portion 308 and the gripping plate 309 and the bottom of the steel cylinder 900 seated on the rotating support component 310, with the end portion of the gripping plate 309 inserted in the opening of the steel cylinder 900;

the control unit controlling the transverse drive 302 to drive the holding component to move along the plane of the workbench 201 until contacting the polishing wheel 402 of the polishing unit; the control unit controlling the polishing drive 400 to drive the polishing wheel 402 and meanwhile controlling the translational drive 303 to drive the holding component to move translationally along the plane of the workbench 201; the control unit controlling the rotary drive to drive the holding component to rotate transversely along the plane of the workbench 201, i.e., the two second telescopic cylinders 304 driving the holding component to rotate in the plane of the workbench 201 towards the polishing component according to the curvature of the external wall of the steel cylinder 900, with one of the second telescopic cylinders 304 standing by when the other one extends and drive the holding component towards the polishing unit (the polishing wheel 402 of the polishing component); wherein, the extension and contraction of the two second telescopic cylinders 304 match the curved surface of the objects, so that the side walls of the steel cylinder 900 contact the polishing component from one end to the other for polishing; wherein, during polishing, the control unit controls the rotating drive to drive the workpiece rotation shaft 313 to rotate, which in turn rotates the rotating support component 310 and further rotates the steel cylinder 900 around the axis connecting the end portions of the rotating support component 310 and the gripping plate 309 so as to accomplish multi-directional, multi-area, and multi-angle polishing of the external walls of the steel cylinder 900;

after the polishing process, the control unit controlling the transverse drive 302, the translational drive 303, and the rotating drive to reset the position of the holding unit 300;

the control unit controlling the second gripping portion drive (the first telescopic cylinder 306) to drive the telescopic shaft to contract and drive the end portion of the gripping plate 309 to rotate reversely (resetting) for 90°, i.e., rotating along the plane of the baseplate 311 so that the bottom of the steel cylinder 900 is oriented to the receiving port 601 of the guide groove 600;

the control unit controlling the suction unit to inject air into the steel cylinder 900 through the suction port 702, which, when the pressure within the steel cylinder 900 is larger than outside, causing the steel cylinder 900 to eject towards the receiving port 601 of the guide groove 600, enter the guide groove 600 via the receiving port 601 of the guide groove 600, slide onto the receiving transfer surface 603 along the bottom side of the guide groove 600 and through the discharge port 602 of the guide groove 600, and leave from the outlet 102 of the shell 100, completing one round of the polishing process.

Example 2

This embodiment involves a rotary multi-angle automated polishing system based on Example 1 yet with a different holding unit 300.

Refer to FIG. 11 through 19. The holding unit 300 comprises a holding component hinged to the workbench 201 via a rotating shaft 700, a propulsion drive 701 configured to drive the holding component to rotate along a plane perpendicular to the rotating shaft 700 towards the polishing component, and a translational drive 303 configured to drive the holding component to move back and forth axially along the rotating shaft 700. A control unit is connected to the propulsion drive 701.

The holding component comprises a baseplate 311, a first gripping portion 308, and a gripping plate 309 hinged to the baseplate 311. The holding unit 300 further comprises a second gripping portion drive configured to drive the gripping plate 309 to rotate along the plane of the baseplate 311. When the gripping plate 309 rotates to where the end portion of the gripping plate 309 is oriented to the first gripping portion 308, the space between the end portions of the first gripping portion 308 and the gripping plate 309 matches the dimensions of the objects. The axis defined by a line connecting the end portions of the first gripping portion 308 and the gripping plate 309 is parallel to the axial direction of the rotating shaft 700. The gripping plate 309 is oriented to the receiving port 601 of the guide groove 600. The first gripping portion 308 is provided with a suction port 702 oriented to the receiving port 601 of the guide groove 600.

The holding unit 300 further comprises a support frame connected to the holding component so that the gripping plate 309 is oriented to the polishing component. The support frame is hinged to the workbench 201 and also connected to the propulsion drive 701. The propulsion drive 701 is hinged to the workbench 201 at one end, so that the propulsion drive 701 rotates vertically in a direction perpendicular to rotating shaft 700, and hinged to the support frame at the other end.

The baseplate 311 is hinged to the hinge plate 305. The rotary drive may drive the baseplate 311 which in turn drives the holding component to rotate back and forth towards the polishing component (towards the polishing wheel 402), i.e., driving the holding component to rotate transversely along the plane of the workbench 201 (horizontally). The rotary drive is positioned at the bottom of the holding device.

In this embodiment, the rotary drive comprises two second telescopic cylinders 304, which are positioned on the top of the holding component (the top of the baseplate 311 as illustrated in the figure showing this embodiment).

The rotating drive of the holding unit 300 drives the workpiece rotation shaft 313 to rotate along the radial direction of the rotating shaft 700.

The polishing method using the rotary multi-angle automated polishing system as disclosed herein comprises the following steps:

(refer to FIG. 20 through 29) placing steel cylinders 900 with a curved body (the objects to be polished) successively on the feeding transfer surface 504, with the bottoms of the steel cylinder 900 facing the receiving port 601 of the guide groove 600 (the first gripping portion 308) and the opening of the steel cylinder 900 facing the gripping plate 309; operating the control panel 104 so that the control unit controls the feeding transfer surface 504 to move towards the reclaiming claw 502;

when an steel cylinder 900 reaching where the reclaiming claw 502 of the feeding unit 501 is, the control unit controlling the opening and closing drive to drive the reclaiming claw 502 to open and, by the motion of the feeding transfer surface 504, causing the steel cylinder 900 to enter the space between the reclaiming claws 502, when the control unit further controls the opening and closing drive to drive the reclaiming claws 502 to close and grasp the steel cylinder 900;

the control unit controlling the feeding drive 503 to drive the feeding unit 501 and the reclaiming claw 502 to rotate vertically around the fixed portion 500 towards the holding unit 300, further transferring the steel cylinder 900 to the space between the end portions of the first gripping portion 308 and the gripping plate 309;

the control unit controlling the second gripping portion drive (the first telescopic cylinder 306) to drive the telescopic shaft to extend, so that the end portion of the gripping plate 309 rotates towards the first gripping portion 308, causing the steel cylinder 900 to be held tightly between the end portions of the first gripping portion 308 and the gripping plate 309 and the bottom of the steel cylinder 900 seated on the rotating support component 310, with the end portion of the gripping plate 309 inserted in the opening of the steel cylinder 900;

the control unit controlling the propulsion drive 701 to drive the holding component to move along a plane perpendicular to the rotating shaft 700 until contacting the polishing wheel 402 of the polishing unit; the control unit controlling the polishing drive 400 to drive the polishing wheel 402 and meanwhile controlling the translational drive 303 to drive the holding component to move translationally along the axial direction of the rotating shaft 700, the control unit controlling the rotary drive to drive the holding component to rotate, i.e., the two second telescopic cylinders 304 driving the holding component to rotate in the plane of the workbench 201 towards the polishing component according to the curvature of the external wall of the steel cylinder 900, with one of the second telescopic cylinders 304 standing by when the other one extends and drive the holding component towards the polishing unit (the polishing wheel 402 of the polishing component); wherein, the extension and contraction of the two second telescopic cylinders 304 match the curved surface of the objects, so that the side walls of the steel cylinder 900 contact the polishing component from one end to the other for polishing; wherein, when different curved surface contacts the polishing wheel 402 successively, the propulsion drive 701 conducts movements of extension and contraction accordingly so as to ensure consistent contact between the external surface of the steel cylinder 900 and the polishing wheel 402; wherein, during polishing, the control unit controls the rotating drive to drive the rotating shaft 313 to rotate, which in turn rotates the rotating support component 310 and further rotates the steel cylinder 900 around the axis connecting the end portions of the rotating support component 310 and the gripping plate 309 so as to accomplish multi-directional, multi-area, and multi-angle polishing of the external walls of the steel cylinder 900;

after the polishing process, the control unit controlling the transverse drive 302, the translational drive 303, and the rotating drive to reset the position of the holding unit 300;

the control unit controlling the second gripping portion drive (the first telescopic cylinder 306) to drive the telescopic shaft to extend, so that the end portion of the gripping plate 309 rotates reversely (resetting) for 90°, causing the steel cylinder 900 to be released and the bottom of the steel cylinder 900 oriented to the receiving port 601 of the guide groove 600;

the control unit controlling the suction unit to inject air into the steel cylinder 900 through the suction port 702, which, when the pressure within the steel cylinder 900 is larger than outside, causing the steel cylinder 900 to eject towards the receiving port 601 of the guide groove 600, enter the guide groove 600 via the receiving port 601 of the guide groove 600, slide onto the receiving transfer surface 603 along the bottom side of the guide groove 600 and through the discharge port 602 of the guide groove 600, and leave via the outlet 102 of the shell 100, completing one round of the polishing process.

The multi-angle automated polishing system disclosed herein may hold the object to be polished tightly with the holding unit. It may move in three perpendicular directions of the object to be polished with the combined operation of the transverse drive, translational drive, and rotary drive of the polishing unit, so as to accomplish multi-angle and multi-directional rotation of the objects to be polished with accurate and precise polishing. The series of holding and polishing steps of the objects to be polished are automated, requiring no manual intervention, which reduces direct contact with the polishing unit and the objects to be polished by the workers and thus greatly protects their health. The polishing equipments require low investments and further saves labour and time costs.

According to the multi-angle automated polishing system disclosed herein, the cooperation among the baseplate, the first gripping portion and the second gripping portion allows more precise holding operation of the holding component. The gripping drive unit drives the second gripping portion to rotate along the plane of the baseplate, allowing more convenient and even automated gripping (holding) and releasing of the objects with high efficiency. The design of the workpiece rotating shaft allows automated rotation of the objects during polishing so as to receive multi-area and multi-angle polishing without manual intervention, rendering high polishing efficiency.

The multi-angle automated polishing system as disclosed herein accomplishes grasping and holding of the objects by the cooperation between the reclaiming claws of the holding unit and the opening and closing drive configured to drive the reclaiming claws. Further, automated transfer of the objects is realized by the feeding portion of the feeding unit and the feeding drive configured to drive the feeding portion rotate vertically around the fixed portion. Therefore, automated holding and feeding processes are realized, which avoids the step of manual feeding and thus reduces contact time between workers and the polishing equipments, greatly improving protection for workers' health. Meanwhile, automated feeding has also improved production efficiency, e.g., production yield in unit time, and reduced labour and time costs.

The multi-angle automated polishing system as disclosed herein can eject the objects from between the suction port and the receiving port of the guide groove via the suction port of the suction unit. As a result, the objects can enter and be collected by the receiving unit automatically without any manual intervention, realizing automated processes of releasing and receiving objects, which avoids the step of manual receiving and thus reduces contact time between workers and the polishing equipments, greatly improving protection for workers' health. Meanwhile, automated feeding has also improved production efficiency, e.g., production yield in unit time, and reduced labour and time costs.

The multi-angle automated polishing system as disclosed herein has a guide groove with a curved bottom, facilitating releasing, and preventing potential blocking and damaging, of the objects, which optimally protect the intactness of the objects. The receiving transfer surface and the receiving transfer drive configured to drive the receiving transfer surface allow the objects to be further transferred by the receiving transfer surface after leaving the discharge port. In this way, it facilitates collection and further reduces the contact between workers and the automated receiving system, protecting the workers' health as well as improving the receiving efficiency.

The rotary multi-angle automated polishing system as disclosed herein requires only simple equipments, easy operations, and low labour intensity. Manual intervention during the polishing process can be substantially spared, which reduced labour intensity, decreasing the labour costs to a large degree and protecting the health of polishing workers. Furthermore, the multi-angle automated polishing method disclosed herein may accomplish multi-area and multi-angle polishing automatically with low manual intervention, high precision, and good polishing effects.

The detailed embodiments described herein are only for the purpose of illustrating the present invention, and are not intended to limit the scope of the present invention in any way. It would be understand by a person skilled in the art that various changes and modifications can be made to the embodiments described herein without departing from the scope and spirit of the present invention. Such changes and modifications are contemplated by the present invention, the scope of which should only be defined by the following claims.

What is claimed is:

1. A multi-angle automated polishing system, comprising:
a workbench and
a holding unit, provided with a holding component for holding an object, a transverse drive configured to drive the holding component to move transversely along a plane of the workbench, a translational drive configured to drive the holding component to move translationally along the plane of the workbench, and a rotary drive configured to drive the holding component to rotate transversely along the plane of the workbench, wherein the holding unit further comprises a rotating unit and a rotating drive configured to drive the rotating unit to rotate;

a polishing unit, provided with a polishing component and a polishing drive configured to drive the polishing unit in operation; and a control unit, connected to the transverse drive, the rotary drive, the rotating drive, and the polishing drive;

wherein the holding component comprises a baseplate, a first gripping portion, and a second gripping portion; and wherein the first gripping portion is hinged to the baseplate, the second gripping portion being hinged to the baseplate, and the holding unit further comprising a second gripping portion drive configured to drive the second gripping portion to rotate along a plane of the baseplate.

2. The multi-angle automated polishing system of claim 1, wherein, when the second gripping portion rotates to where an end portion of the second gripping portion is oriented to the first gripping portion, a distance between the first gripping portion and the end portion of the second gripping portion matches a dimension of the object, a line connecting end portions of the first gripping portion and the second gripping portion being parallel with the plane of the workbench and perpendicular to the direction in which the holding component moves transversely along the plane of the workbench.

3. The multi-angle automated polishing system of claim 2, wherein the second gripping portion rotates around the axis defined by a line connecting the end portions of the first gripping portion and the second gripping portion.

4. The multi-angle automated polishing system of claim 1, wherein the second gripping portion drive comprises a telescopic shaft and a first telescopic cylinder configured to drive the telescopic shaft in a telescopic movement, the first telescopic cylinder being hinged on the baseplate; and one end portion of the telescopic shaft is connected to an end portion of the second gripping portion, another end portion connected to the first telescopic cylinder.

5. The multi-angle automated polishing system of claim 1, further comprising a guide rail, the holding unit being provided on the guide rail and the transverse drive being connected to the holding unit to drive the holding unit to move along the guide rail.

6. The multi-angle automated polishing system of claim 1, wherein the rotary drive comprises two second telescopic cylinders both connected to the same side of the holding component and spaced apart from each other, the two second telescopic cylinders alternately driving the holding component to rotate towards the polishing component along the plane of the workbench.

7. The multi-angle automated polishing system of claim 1, wherein the rotating unit comprises a workpiece rotating shaft connected to the first gripping portion and positioned on a side of the first gripping portion facing the second gripping portion, the end portion of the workpiece rotating shaft facing an end portion of the second gripping portion; and the rotating drive is connected to the workpiece rotating shaft and drives the workpiece rotating shaft to rotate.

8. The multi-angle automated polishing system of claim 1, wherein the polishing component comprises a polishing shaft and a polishing wheel, an axis of the polishing shaft being parallel to an axis defined by a line connecting end portions of the first gripping portion and the second gripping portion when the second gripping portion rotates to where an end portion of the second gripping portion is facing the first gripping portion; and the polishing wheel is connected to an end portion of the polishing shaft, and the polishing drive is connected to another end portion of the polishing shaft and drives the polishing shaft to rotate.

9. A multi-angle automated polishing method, comprising the following steps:

placing an object to be polished on a holding component of a holding unit, the holding component comprises a baseplate, a first gripping portion, and a second gripping portion; hinging the first gripping portion to the baseplate, hinging the second gripping portion to the baseplate, and the holding unit further comprising a second gripping portion drive configured to drive the second gripping portion to rotate along a plane of the baseplate;

controlling by a control unit a transverse drive to drive the holding component to move transversely along a plane of a workbench to contact a polishing component of a polishing unit;

controlling, by the control unit, a polishing drive to drive the polishing component to rotate;

controlling, by the control unit, a translational drive to drive the holding unit to move translationally along the plane of the workbench, and meanwhile controlling by the control unit a rotary drive to drive the holding unit to move transversely along the plane of the workbench;

controlling by the control unit a rotating drive to drive the rotating unit to rotate so as to bring the object to be polished to rotate, while controlling, by the control unit, according to a surface curvature of the object to be polished, the rotary drive to drive the holding unit to move back and forth relative to a direction in which a hinged plate faces the polishing component, causing the sides of the object to be polished to contact and rub on the polishing component from one end portion to another end portion for the purpose of polishing;

resetting by the control unit the polishing component; and receiving the object polished.

* * * * *